United States Patent [19]
Tominaga et al.

[11] Patent Number: 6,164,732
[45] Date of Patent: Dec. 26, 2000

[54] PRESSURE CONTROLLING DEVICE FOR VEHICLE

[75] Inventors: Tsutomu Tominaga; Tadayuki Fujimoto, both of Tokyo, Japan

[73] Assignee: Mitsubishi Denki Kabushiki Kaisha, Tokyo, Japan

[21] Appl. No.: 09/076,114

[22] Filed: May 12, 1998

[30] Foreign Application Priority Data

Dec. 17, 1997 [JP] Japan .................................... 9-348268

[51] Int. Cl.⁷ .................................................. B60T 8/42
[52] U.S. Cl. ................................ 303/119.2; 303/115.2
[58] Field of Search ........................... 303/119.1, 119.2, 303/119.3, DIG. 10, 116.4, 115.2, 115.1; 137/596.17, 884

[56] References Cited

U.S. PATENT DOCUMENTS

| | | | |
|---|---|---|---|
| 5,374,114 | 12/1994 | Burgdorf et al. | 303/119.2 |
| 5,452,948 | 9/1995 | Cooper et al. | 303/119.2 |
| 5,662,392 | 9/1997 | Hinz | 303/119.2 |
| 5,766,026 | 6/1998 | Cooper et al. | 439/76.1 |
| 5,842,753 | 12/1998 | Staib et al. | 303/119.3 |
| 5,921,639 | 7/1999 | Hosoya | 303/119.2 |

FOREIGN PATENT DOCUMENTS

5-505446 8/1993 Japan .
6-298059 10/1994 Japan .

*Primary Examiner*—Douglas C. Butler
*Assistant Examiner*—Melanie Talavera
*Attorney, Agent, or Firm*—Sughrue, Mion, Zinn, Macpeak & Seas, PLLC

[57] ABSTRACT

A pressure controlling device for vehicle comprising a control unit having a plurality of electromagnetic portions, an electronic circuit portion provided in a housing and a conductive connecting member for electrically connecting these, an actuator unit having a plurality of valve bodies and a network of pressure path, wherein the plurality of valve bodies are protruded so as to be inserted in the plurality of electromagnetic coil portions in the control unit respectively; and the electromagnetic coil portions are formed by a bobbin with coil, an upper yoke and a lower yoke for fabricating a magnetic path and an elastic object provided between the lower yoke and the bobbin and a means for contacting the bobbin to a part of the housing in order to restrict movement of the bobbin, whereby a stress applied to an electrically connecting portion in the electromagnetic portions caused by engagement and separation between the control unit portion and the actuator unit can be relaxed.

10 Claims, 9 Drawing Sheets

PRESSURE CONTROLLING DEVICE FOR VEHICLE

BACKGROUND OF THE INVENTION

1. Field of the Invention

The present invention relates to a break pressure controlling device for preventing a slip of a wheel, in particular a pressure controlling device which is constituted integrally by a break pressure actuator and a controlling circuit thereof.

2. Discussion of Background

Conventionally, an anti-skid break, a traction control, a stability control system or the like is proposed as a system of controlling break pressure in a vehicle. These systems include a pressure source for producing the break pressure such as a master cylinder and a motor pump, an actuator for controlling pressure (hereinbelow referred to as H/U) which is provided with respect to wheel cylinders provided respectively in the wheels, various sensors for detecting rotational speeds of the wheels, an operation of accelerator pedal, acceleration of vehicle body and so on, and a control unit (hereinbelow referred to as ECU) for outputting a signal for driving said H/U based on information from these sensors. In this, a break pressure applied by a driver or a break pressure produced in a motor pump is controlled by decompressing, holding or compressing upon operations of H/U in accordance with an instruction from ECU responding to the information of sensor, whereby a slip of a wheel can be prevented; a drivability and a stability of the vehicle are obtainable; or a running posture of the vehicle can be controlled.

Incidentally, H/U was provided in an engine room and ECU was provided in a cabin conventionally in such a system. However, in recent years, a device provided with H/U and ECU integrally in the engine room is proposed.

Figure 9:
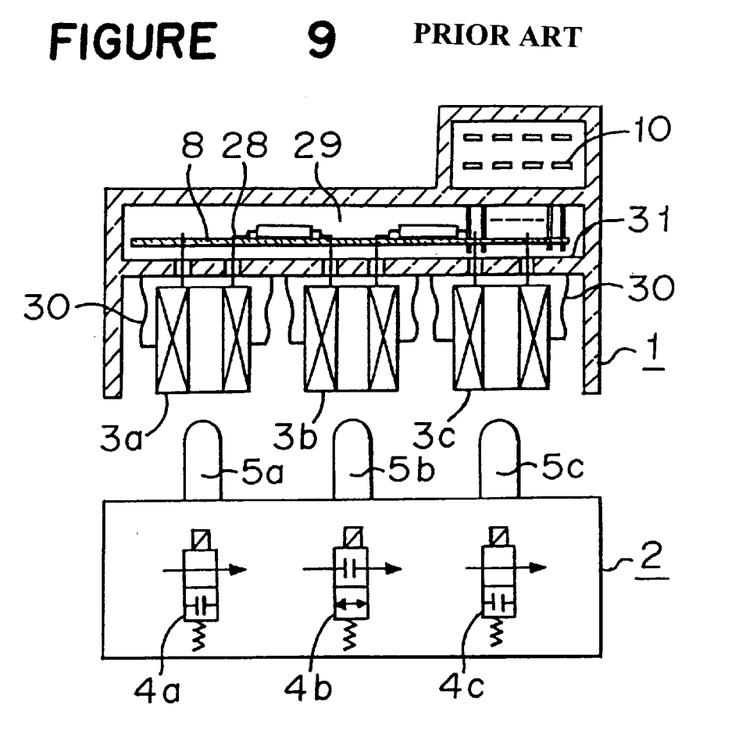
FIG. 9 is a front view partly in section for schematically showing a conventional anti-skid controlling device by dividing into two parts.

For example, a conventional device of the anti-skid device disclosed in Japanese Unexamined Patent Publication No. Hei 5-505446 (JP-A-5-505466), wherein the structure as a whole is shown in FIG. 9. In FIG. 9, numeral 1 is a cross-sectional view of ECU having a plurality of electromagnetic coils 3a, 3b and 3c; and numeral 2 designates H/U for controlling break pressure having a plurality of valve units 4a, 4b and 4c, which is schematically shown. ECU and H/U are engaged to each other and equipped in a vehicle as an integral object. Meanwhile, the valve units 4a through 4c are built in domes 5a through 5c. The domes 5a through 5c are inserted in a central holes of the coils 3a through 3c and located in a predetermined position. Further, these coils are held by a supporting member 31 through an elastic holding member 30 so as to be movable. Numeral 8 designates an electronical circuit portion connected to a connector 10 for enabling connection to the outside and electrically connected to the coils 3a through 3c for supplying an electric power.

In such a device having an electrical part and a mechanical part which are provided separately and integrated when it is finished as a final product, it is important to transmit an electric current applied to the coils effectively to the valve units and to simplify the integration and the separation. Accordingly, in this conventional device, positions of the valve units and the coils are determined such that the coils 3a through 3c can play using the elastic holding members 30 (springs in this example) to facilitate insertion of the domes 5a through 5c and the coils are pressed to contact H/U 2 after the insertion. The electronic circuit portion 8 outputs signals for driving the electromagnetic coils 3a through 3c respectively, in response to an information of wheel speed detected by a wheel speed sensor (not shown). By these driving signals, the coils are applied with a electric current to thereby operate the valve units 4a through 4c for decompressing, holding or compressing the break pressure, whereby an anti-skid control is performed.

Figure 10:
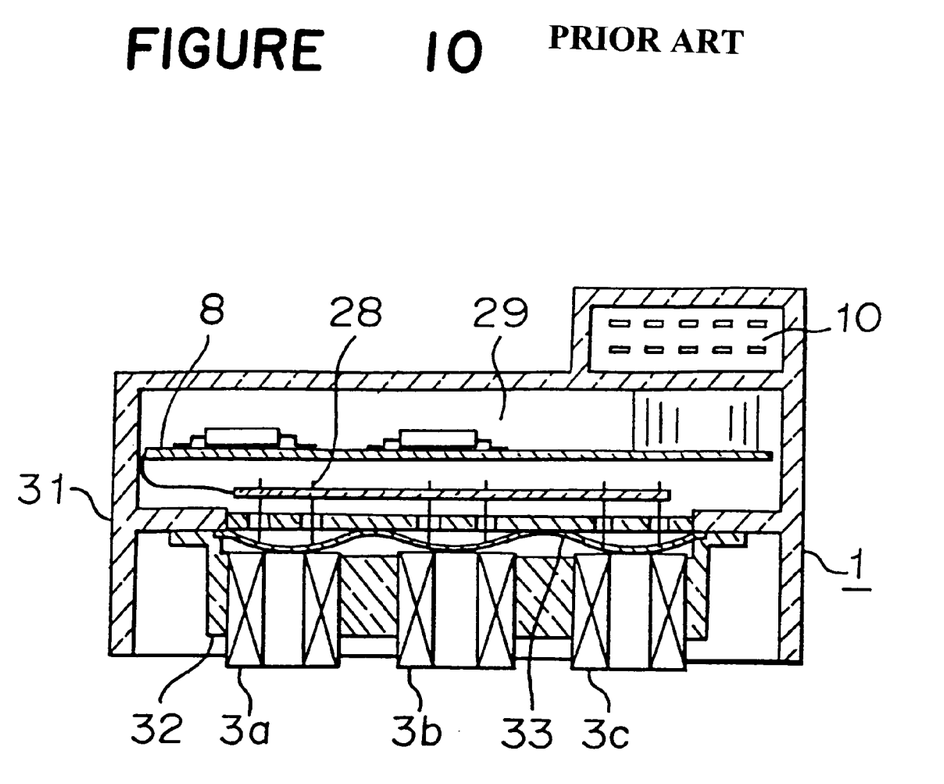
FIG. 10 a cross-sectional view for showing ECU of another conventional anti-skid controlling device.

Further, in Japanese Unexamined Patent Publication No. Hei 6-298059 (JP-A-6-298059), a conventional device is disclosed, which is shown in FIG. 10. In FIG. 10, the same numerals as those in FIG. 9 designate the same or the similar portions. Because H/U is substantially the same as that described in the above, only ECU is shown. Coils 3a through 3c are embedded in a component 32 having a play from the outer periphery of the coils, and this constitutional portion 32 is fixed to a supporting member 31. Numeral 33 designates a spring which works to press the coils 3a through 3c such that the coils are in contact with H/U 2. When ECU 1 having such a structure is engaged in H/U 2, domes 5a through 5c having built-in valve units 4a through 4c are inserted in holes of the coils 3a through 3c; and the coils work to push an assembling face of H/U 2 by the spring 33, whereby relationship between positions of the domes and positions of the coils are determined as described in the above. Further, the coils 3a through 3c can play in the component 32 to facilitate the engagement.

Incidentally, in both of the conventional techniques, it was necessary to proof against water since the electronic circuit portion 8 is built in the devices.

In the conventional devices, a portion 28 for connecting the coil and the electronic circuit portion had a structure of receiving a stress when ECU and H/U were integrally engaged. The electric connecting portion was applied with this stress, suffered deterioration with age and/or applied with a thermal stress, whereby there was a possibility of breakage at the worst.

Also, there were many small apertures for penetrating the coil terminals in the electronic circuit chamber, whereby it was difficult to proof the electronic circuit chamber against water.

Also, when ECU was assembled, it was necessary to insert the coil terminals into a predetermined small aperture for electrically connecting these, wherein there was a problem that capability of assembling was insufficient.

SUMMARY OF THE INVENTION

It is an object of the present invention to solve the above mentioned problems inherent in the prior art and to provide a pressure controlling device for vehicle in which the positional relationship between coil terminals and a connecting member is hardly changed by engagement and/or separation therebetween in order to relax a stress exists in the coil terminals, while keeping a easiness of engaging ECU and H/U.

Another object of the present invention is to obtain a pressure controlling device for vehicle improved on waterproofness in an electronic circuit space and capability of assembling ECU.

Another object of the present invention is to obtain a pressure controlling device for vehicle which can manage a mechanical stress and/or a thermal stress in an electronic circuit.

According to a first aspect of the present invention, there is provided a pressure controlling device for vehicle comprising a first unit having an electronic circuit portion provided in a housing, a plurality of electromagnetic coil portions and a conductive connecting member for electrically connecting these, a second unit having a plurality of valve bodies and a network of pressure paths, wherein the protruded plurality of valve bodies in the second unit are provided so as to be inserted in the plurality of electromagnetic coil portions in the first unit respectively, wherein the electromagnetic coil portions are composed of a bobbin around which a coil is wound, an upper yoke each and a lower yoke provided around the bobbin and forming a magnetic path, an elastic object provided between the lower yoke and the bobbin and a means for contacting the bobbin to a part of the housing in order to restrict movement of the bobbin.

According to a second aspect of the present invention, there is provided a pressure controlling device for vehicle, wherein a first unit includes a coil housing for accommodating a plurality of magnetic coil portions, an intermediate member having an electronic circuit portion and provided in the coil housing and a cover for covering the intermediate member; and a conductive connecting member including a first contact portion for connecting to the electronic circuit portion and a second-contact portion for connecting to the plurality of electromagnetic coil portions is provided in the coil housing; and bobbins in the plurality of electromagnetic coil portions are constructed so as to be in contact with a part of the coil housing.

According to a third aspect of the present invention, there is provided a pressure controlling device for vehicle, wherein a first unit includes an outer housing having a first chamber having an inner housing and a second chamber provided with an electronic circuit portion, and a cover for covering the second chamber; a conductive connecting member including a first contact portion for connecting to the electronic circuit portion and a second contact portion for connecting to the plurality of electromagnetic coil portions are provided in the inner housing; and bobbins in the plurality of electromagnetic coil portions are constructed so as to be in contact with a part of the inner housing.

According to a fourth aspect of the present invention, there is provided a pressure controlling device for vehicle, wherein an electromagnetic coil portion includes an upper yoke and a lower yoke both provided in a bobbin around which a coil is wound interposing a gap; a part of housing is interposed between the upper yoke and the bobbin; an elastic object is interposed between the lower yoke and the bobbin; and the bobbin is engaged by both of the yokes so as to be in contact with a part of the housing so that both of the yokes can play in the gap with respect to the housing when a valve body is inserted.

According to a fifth aspect of the present invention, there is provided a pressure controlling device for vehicle, wherein first contact portions of conductive connecting members are concentrated on a single location and face on the side of providing an electronic circuit portion in a member for equipping the electronic circuit portion.

According to a sixth aspect of the present invention, there is provided a pressure controlling device of vehicle, wherein an electronic circuit portion is electrically connected to a connector portion connectable with the outside by arranging this interposing a gap between the electronic circuit portion and the connector portion; and the electronic circuit portion is fixed to a housing such that at least a portion having a distance from a portion for connecting to the connector portion or a portion for connecting to a first contact portion is engaged flexibly with the housing.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

A detailed explanation will be given of preferred embodiments of the present invention in reference to FIGS. 1 through 10 as follows, wherein the same numeral references are used for the same or the similar portions and description of these portions is omitted.

EXAMPLE 1

Figure 1:
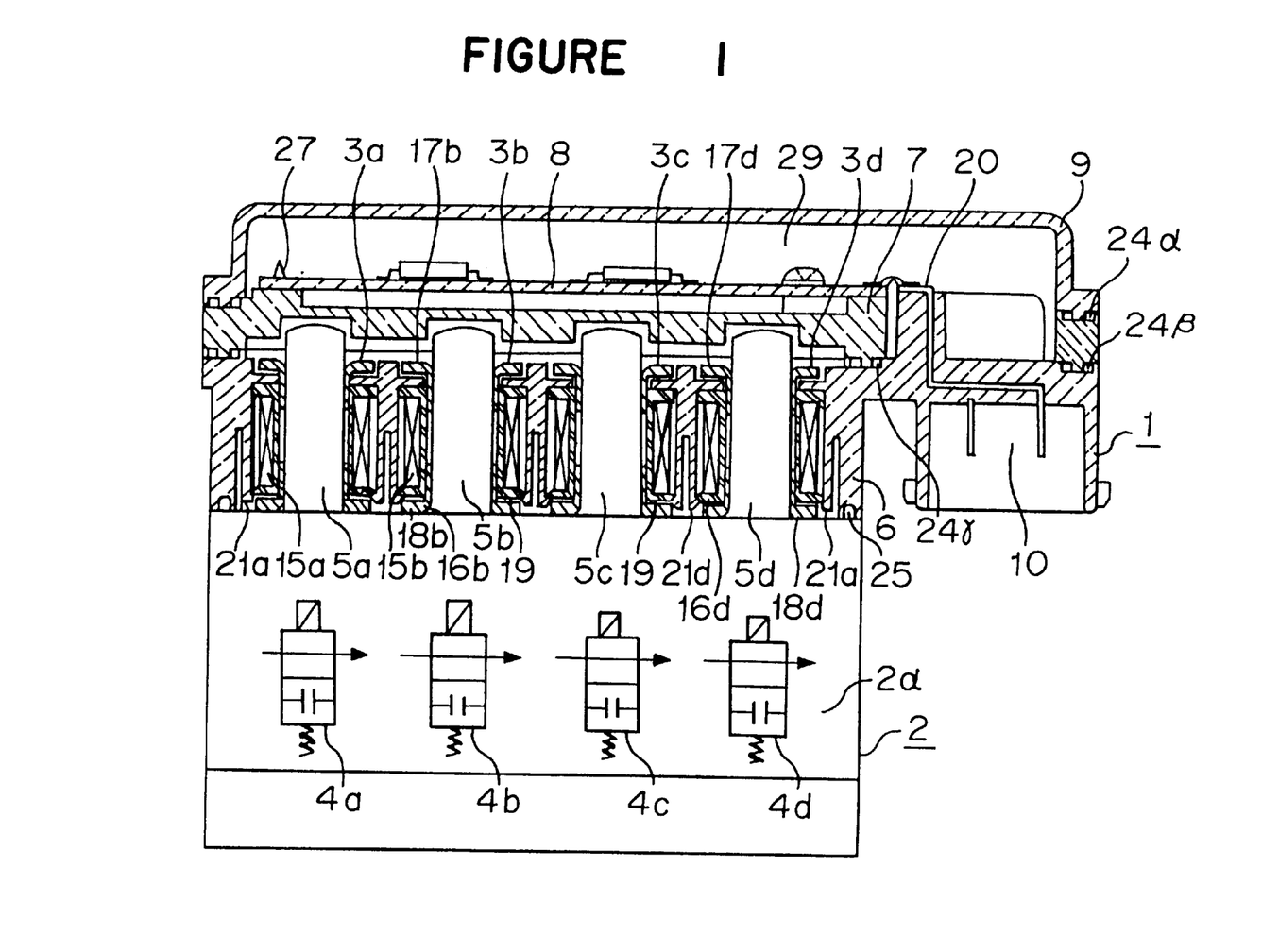
FIG. 1 is a front view partly in section for schematically showing a pressure controlling device for vehicle as a whole according to Example 1 of the present invention.
Figure 2:
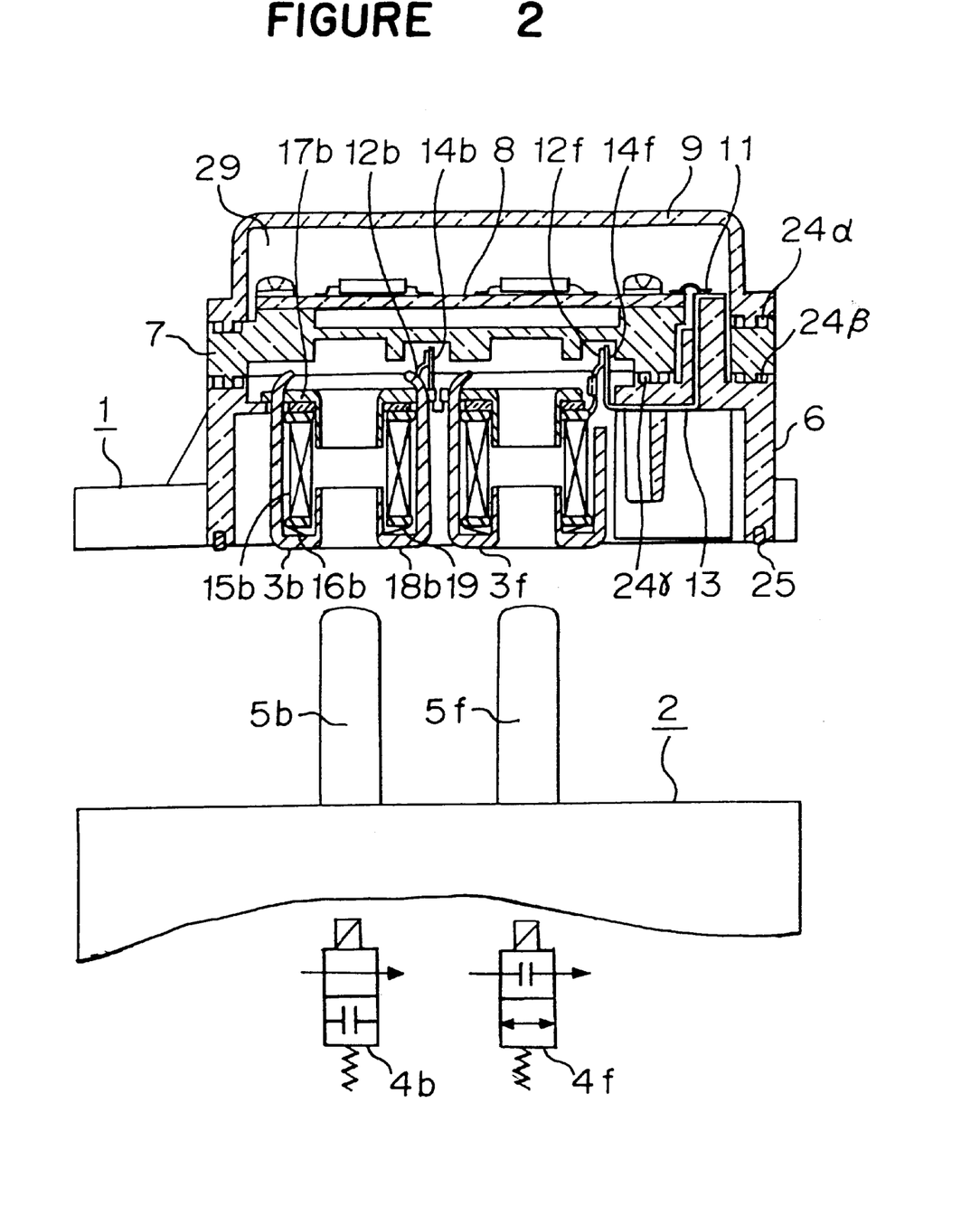
FIG. 2 is a side view partly in section for schematically showing the pressure controlling device for vehicle by dividing it into two portions in accordance with Example 1 of the present invention.
Figure 3:
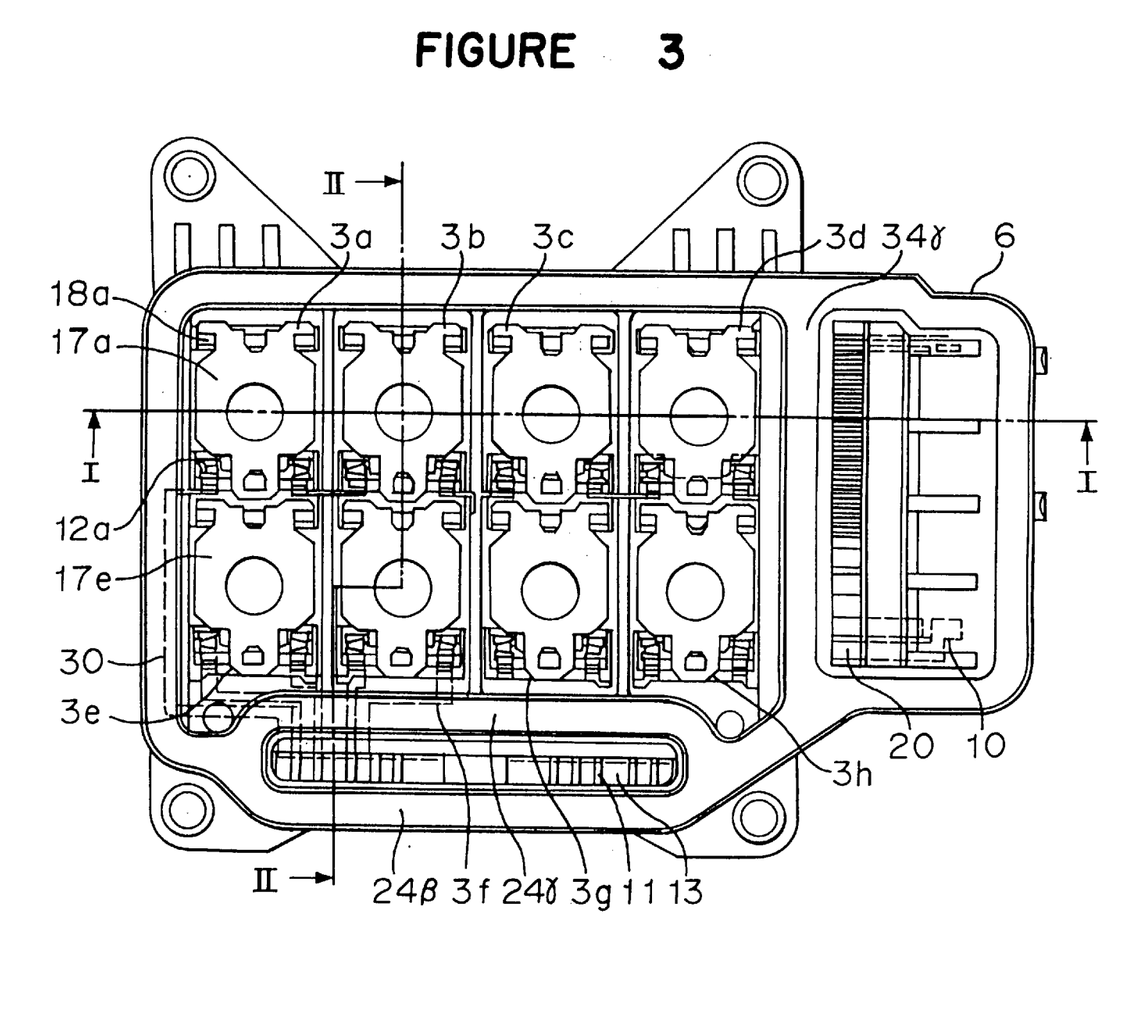
FIG. 3 is a plan view of the pressure controlling device for vehicle by omitting several parts in accordance with Example 1 of the present invention.

FIGS. 1 through 3 show a structure of anti-skid controlling device according to Example 1 of the present invention. FIG. 1 is a front view partly in section for showing an integrated device, and FIG. 2 is a side view partly in section for showing a state that units of the device are separated. FIG. 3 is a plan view in which several parts are omitted in order to exhibit an inner structure. In this Example, eight valve bodies 4a through 4h and eight electromagnetic coils 3a through 3h are provided. In other words, two valves are respectively provided in four wheels to control by a breaking pressure using a pair of a constantly opening valve 4a and a constantly closing valve 4e (both not shown). Further, FIG. 1 is a cross-sectional view taken along line I—I viewed in the direction of the arrows I of the FIG. 3, and FIG. 2 is a cross-sectional view taken along a line II—II viewed in the direction of the arrows II of the FIG. 3.

In FIG. 1, numeral 1 designates a first unit constituting ECU; and numeral 2 designates a second unit constituting H/U, in which only ECU is shown in section. The first unit 1 is composed of an electronic circuit portion 8, a housing accommodating electromagnetic coil portions 3a through 3h and a cover 9 for covering these. The housing is formed by a coil housing 6 for accommodating electromagnetic coil portions 3a through 3h and an intermediate member 7 provided with the electronic circuit portion 8 which is provided in the coil housing 6. On the other hand, the second unit 2 is composed of domes 5a through 5h respectively integrating constantly opening valves 4a through 4d and constantly closing valves 4e through 4h, which are schematically shown, and a unit block 2α integrating a break path and so on (not shown). The numbers of the electromagnetic coils 3, the valve bodies 4 and the domes 5 are respectively eight (represented by suffixes a through h), wherein two of each are provided in each wheel. Because of the electromagnetic coils, each of the valve bodies and each of the domes have a similar structure and a similar constitution, a part of these is used for explanation. The valve body 4 can connect and disconnect the break path by an excitation and a deexitation of the electromagnetic coil 3, wherein there are two types in the valve bodies, namely the constantly opening valve and the constantly closing valve, which can be classified depending on a state of valve at the time of deexitation. When the first unit 1 and the second unit 2 are engaged, the domes 5a through 5d are respectively inserted in central holes of the electromagnetic coils 3a through 3d in FIG. 1.

FIG. 2 is a side view partly in section, in which ECU is shown in section. Numeral 13 designates a conductive connecting member ordinarily named bus bar, which is composed of a first contact portion 11 for electrically connecting with the electronic circuit portion 8, and a second contact portions 14b and 14f for connecting with terminals 12b and 12f of the electromagnetic coils, wherein said conductive connecting member having a shape of connecting these contact portions. In this Example, the number of second contact portions is 8×2=16.

The electromagnetic coil portion is composed of a bobbin 16b around which a coil 15b is wound and in which the terminal 12b is provided, an upper yoke 17b and a lower yoke 18b which are provided in the periphery of the bobbin 16b and form a magnetic path, and an elastic object 19 provided between the lower yoke 18b and the bobbin 16b. The elastic object 19 is, for example, a leaf spring, which forces the bobbin 16b to be in contact with a part of the coil housing 6. By this pressure of the spring 19, the bobbin 16b is restricted to move in the upward direction and the downward direction in FIG. 2. Further, a part of the coil housing 6 is interposed between the upper yoke 17b and the bobbin 16b.

The intermediate member 7 is equipped with the electronic circuit portion 8 and formed so that the first contact portion 11 of bus bar 13 is inserted to protrude in the vicinity of the electronic circuit portion 8. In other words, the intermediate member 7 is holed so that the first contact portion 11 of bus bar 13 can be exposed and exhibited on the side of providing the electronic circuit portion. Also, the contact portion 20 of connector 10 can be inserted in the intermediate member 7 similarly. The intermediate member 7 is sandwiched by the coil housing 6 and the cover 9.

Although not shown in H/U 2, a reserver for reserving break fluid, a motor pump for increasing pressure of the reserved break fluid and a break path for connecting these are integrated therein, as in the conventional device. Concerning driving of the valve body and the motor pump, the electronic circuit portion 8 applies electricity or cut electricity to the electromagnetic coil 3 and the motor pump so that the break pressure is increased, decreased or held depending on behavior of the wheels.

FIG. 3 is a plan view in which the cover 9, the electronic circuit portion 8, the intermediate member 7 and the second unit 2 are omitted. In the Figure, the eight electromagnetic coils 3a through 3h are equipped in the coil housing 6. The electromagnetic coil has a terminal 12a in the bobbin for connecting the coil wire to the bus bar 13, a part of which is shown by a broken line. In order for enabling electrical connection, for example, the terminal 12a is fixed to the bus bar 13 by welding. Also, the first contact portion 11 at one end of the bus bar 13 is concentrated on a single position. The contact portion 20 of the connector 10 connectable to the outside is positioned adjacent to the first contact portion 11.

Figure 5A:
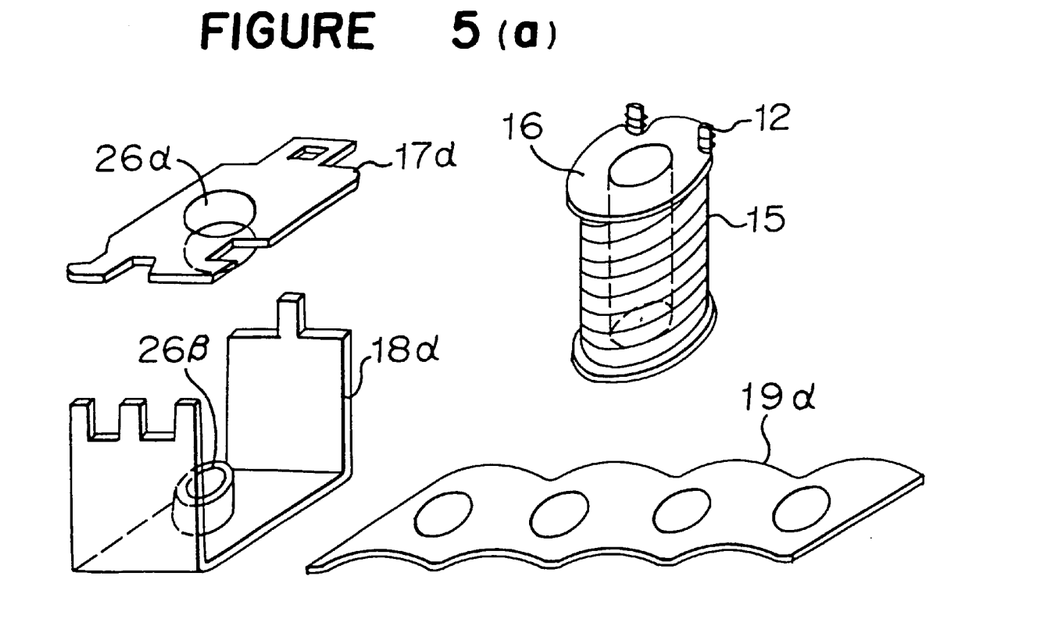
FIG. 5a is a schematical view of parts composing an electromagnetic coil portion according to Examples 1 and 2 of the present invention.

The electromagnetic coil portion 3 and a process of assembling this is described with reference to FIGS. 1 through 3 and 5a. At first, the bobbin 16 around which the coil 15 is wound is attached to the coil housing 6. At this time, the bobbin 16 is temporarily supported in the coil housing 6 by stopper pieces 21a shown in FIG. 1. In the next, the leaf spring 19α shown in FIG. 5a is disposed in the lower yoke 18α, and a protruded portion 26β positioned at the center of the lower yoke 18α is inserted in a hole of the bobbin 16. In the next, the upper yoke 17α is disposed coaxially with the lower yoke 18α, and the lower yoke 18α and the upper yoke 17α are engaged. Both of the yokes are engaged under a state that a part of the coil housing 6 is interposed between the upper yoke 17α and the bobbin 16 to be held thereby and the bobbin 16 is weakly in contact with a part of the coil housing 6 by the spring 19. A plurality of claws of the lower yoke 18α are partly bent on the upper yoke 17α. In the next, the coil terminal 12 and the second contact portion 14 of the bus bar are connected, for example, by welding. As a result of the above-mentioned procedure, the electromagnetic coil portion 3 is integrated into the coil housing 6.

In the next, the electronic circuit portion 8 is fixed to the intermediated member 7. The intermediate member 7 is equipped in the coil housing 6, for example by adhering or the like, after the bus bar 13 and the contact portion 20 of connector 10 are exposed from the hole of intermediate member 7. Further, the electronic circuit portion 8, the first contact portion 11 and the contact portion 20 of connector 10 are electrically connected respectively. Finally, the cover 9 is equipped in the intermediate member 7. Thus, the first unit 1 is assembled. In this case, a means for contacting the bobbin 16 with a part of the coil housing 6 is composed of the spring 19 and both of the yokes 17 and 18.

In addition, the periphery of the electromagnetic coil portion is described in detail. In FIG. 2, because ECU 1 and H/U 2 are separated, the spring 19 is compressed scarcely. When ECU 1 and H/U 2 are integrated from this state as shown in FIG. 1, the spring 19 is compressed and the bobbin 16b is pressed to be in contact with the coil housing 6. Because both of the yokes are integrated and the bobbin 16b is in contact with the coil housing 6, there is a gap between the upper yoke 17 and the coil housing 6 as shown in FIG. 1. By the compression of the spring, the electromagnetic coil 3 can be in contact with the second units 2 and the dome 5b can be arranged at a predetermined position with respect to the electromagnetic coil 3b. In other words, the spring 19 has a dual functions of contacting the bobbin 16 with the coil housing 6 and contacting the electromagnetic coil portion 3 with the second unit 2. Further, the positional relationship between the coil terminal 12*b* and the second contact portion 14*b* of bus bar is not changed even though ECU 1 and H/U 2 are separated or integrated. Accordingly, such a structure has a great merit with respect to a stress in a portion of connecting the terminal 12*b* and the second contact portion 14*b* of bus bar.

Because the device is ordinarily equipped in an engine room and the electromagnetic coil is applied with electricity, the range of temperature change is supposed to be from about −20° C. to about +100° C. An expansion as a result of this thermal stress can be considered as following. Provided that a linear coefficient of expansion of plastic, for example, polybutylene terephthalate (PBT), as a material of the coil housing 6 and the bobbin 16*b* is about $30 \times 10^{-6}$ mm/° C.; a linear coefficient of expansion of brass as a material of the bus bar 13 is about $18 \times 10^{-6}$ mm/° C.; and the length of a part is 50 mm, there is a displacement of about 0.08 mm in the part. Further, a displacement caused by the engagement is supposed to be several times larger than the thermal displacement though it depends on a structure. Therefore, for example, solder is used for bonding, a bonded surface has poor durability and broken by a crack in the solder at worst. In a case of electric welding, weak parts other than the bonded surface, for example terminals, are possibly broken. Therefore, it is necessary to reduce the amount of displacement as small as possible. In this Example, there is no displacement of the bonded surface caused by the engagement and the separation, and only the thermal displacement is left. Provided that the length of coil terminal 12 is as short as several millimeters and the material of the bus bar 13 and the coil terminal 12 is brass, the expansion is supposed to be in the same level. Therefore, the thermal displacement becomes small enough to be ignored. Further, there is a function of absorbing the displacement by a bending of the bus bar 13.

Figure 4:
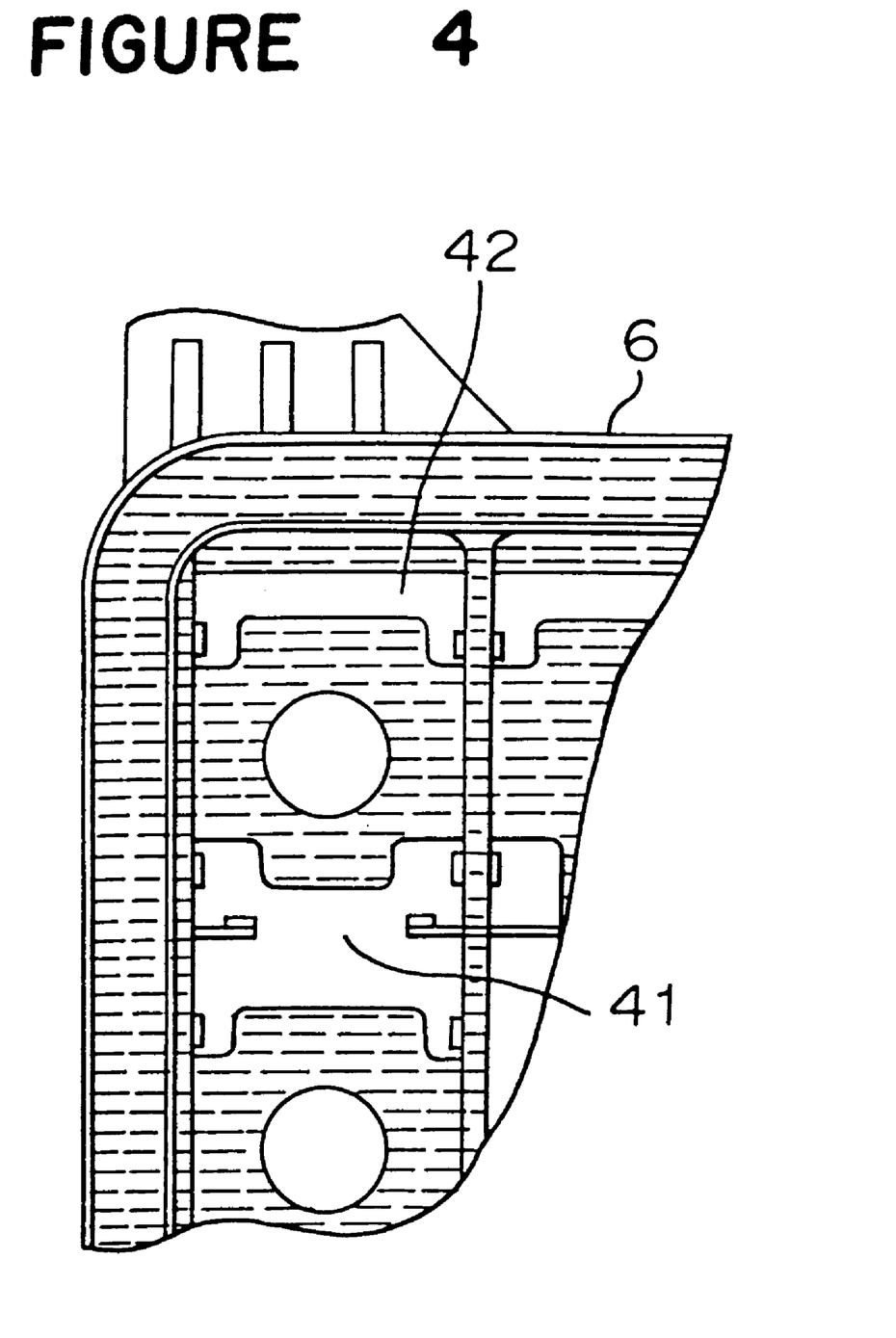
FIG. 4 is an enlarged view of the pressure controlling device for vehicle partly omitted in accordance with Example 1 of the present invention.

There is a small gap between the upper and lower yokes 17, 18 and the bobbin 16 in the direction of diameter of the hole to which the dome 5 is inserted so that both of the yokes can play in the bobbin. Further, between both of the yokes, the coil housing 6 is interposed. However, the size of the hole in the coil housing 6 for accommodating the yokes and the bobbin is large and a gap from the coil housing 6 exists. Therefore, both the yokes can play within the gap with respect to the coil housing 6. FIG. 4 is an enlarge view for explaining such a structure. FIG. 4 shows a part of coil housing 6 having holes 41 and 42 before assembling the electromagnetic coil portion 3, wherein electromagnetic coil portion 3 is omitted from FIG. 3. In the Figure, parts covered by broken lines designate a material forming the coil housing. When H/U 2 is engaged in this structure, the dome 5 can easily be inserted therein. Namely, the dome is fixed and the dimensional tolerance of the second units 2 can be absorbed in the playable electromagnetic coil, whereby the insertion can be easy.

Further, the terminal of electromagnetic coil is provided in the coil housing 6 having relatively large holes 41 and 42 but is not inserted in a small hole for inserting terminal. Also, the numeral 21*d* shown in FIG. 1 is a stopper piece having a protrusion for supporting the bobbin 16*d* in the coil housing 6. Accordingly, the capability of assembling the electromagnetic coil portion is improved. In this case, a means for contacting the bobbin 16 with a part of the coil housing 6 is constituted by the stopper piece 21. A component other than the stopper piece can be used for supporting the bobbin in the housing.

EXAMPLE 2

Figure 5B:
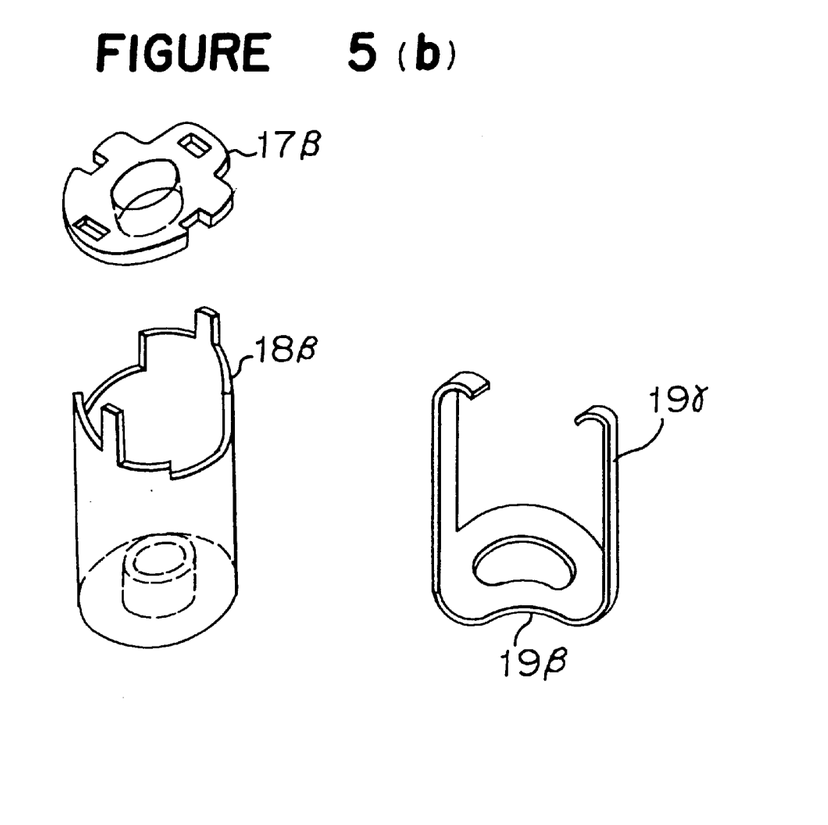
FIG. 5b is a schematical view of parts composing an electromagnetic coil portion according to Examples 1 and 2 of the present invention.

In this Example 2, an electromagnetic coil portion is specifically described in reference of FIGS. 5*a* and 5*b*. The electromagnetic coil portion is composed of a bobbin 16 around which a coil 15 having the ends connected to the bobbin is wound, and an upper yoke 17, a lower yoke 18 and a spring 19 provided between the lower yoke 18 and the bobbin 16. In FIG. 5*a*, the electromagnetic coil portion described in Example 1 is shown, wherein the lower yoke 18α is a ⊐-like shape, the lower yoke 18α has a protruded portions for engaging the lower yoke 18α and the upper yoke 17α; and the upper yoke 17α has holes and notches for inserting the protruded portions. Also, in both the yokes, cylindrical protrusions 26α and 26β for accommodating the bobbin 16 in order to form a path of magnetic force are provided. Magnetic force is formed from the upper yoke 17α through the protrusion 26α, a plunger of valve body (not shown), the protrusion 26β of the lower yoke and the lower yoke 18α back to the upper yoke 17α. By this, the plunger of valve body is moved. Incidentally, there is a small gap between the outer peripheries of protrusions 26α and 26β and the inner periphery of the hole of bobbin, wherein the bobbin is in contact with the yoke inwardly. On the other hand, because the spring 19α can have a shape of having a plurality of spring portions because the lower yoke 18α has a ⊐-like shape. In this Example, two sets of the springs respectively having four spring portions corresponding to the number of coils of eight are used.

In FIG. 5*b*, the electromagnetic coil portion according to Example 2 is shown, wherein the lower yoke 18β is made to be a cylindrical shape. By making the yoke to be in a cylindrical shape, the path of magnetic force has an improved efficiency in comparison with the yoke shown in FIG. 5*a*. Accordingly, the thickness of yoke can be thin in comparison with the yoke shown in FIG. 5*a*. Incidentally, a spring 19β is in a single form. Further, stopper pieces for contacting the bobbin 16 with the coil housing 6 is provided in this spring 19β. By hanging the tip portions of stopper pieces 19γ on a part of a coil housing 6, the bobbin 16 and the coil housing 6 are in contact with each other. Accordingly, the length of the stopper pieces 19γ is determined by the height of bobbin 16 and the thickness of coil housing 6. Under this state, the coil housing 6 is interposed between the upper yoke 17β and the lower yoke 18β. Because the bobbin 16 is the same as that shown in FIG. 5*a*, it is not shown. In this case, a means for contacting the bobbin 16 with a part of the coil housing 6 is constituted by the spring 19β and the stopper pieces 19γ thereof.

As described in the above, the electromagnetic coil portion is satisfactory to have a structure that the bobbin 16 around which the coil is wound is accommodated in the upper yoke 17 and the lower yoke 18; the elastic object 19 is provided between the lower yoke 18 and the bobbin 16; and after the dome 5 accommodating the valve body is inserted into the bobbin and the yokes, the coil is applied with electricity for exciting and unexciting, whereby the break path is connected or disconnected by moving the valve body, for example, the plunger. Therefore, the shapes of the bobbin, the yokes and the elastic object can be changed variously. A part of the coil housing 6 can play between the upper yoke 17 and the lower yoke 18, wherein the part of the coil housing 6 is interposed between the upper yoke 17 and the lower yoke 18. By forming or assembling both the yokes so that they can play with respect to the bobbin 16, an capability of assembling the electromagnetic coil and a capability of engaging ECU 1 and H/U 2 are improved.

Other than the method of contacting the part of coil housing 6 with the bobbin 16 by means of the leaf spring 19, it is possible to contact the bobbin 16 with the coil housing 6 by making the stopper piece 21 to be a suitable length. Further, it is also possible to contact the bobbin 16 with the coil housing 6 by engaging these using projections and recesses provided on the contacting surface therebetween.

EXAMPLE 3

Figure 6:
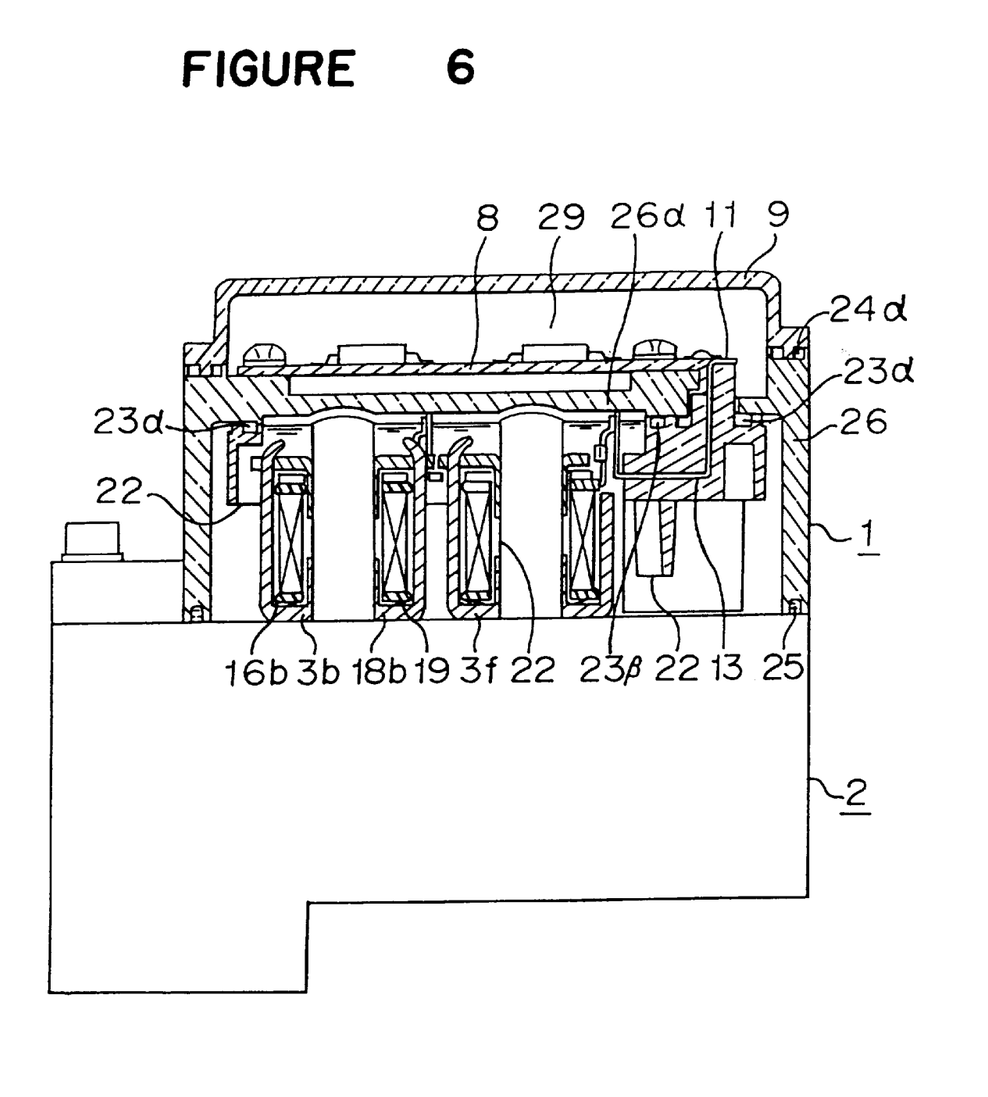
FIG. 6 is a side view partly in section for schematically showing a pressure controlling device for vehicle in accordance with Example 3 of the present invention.

Example 3 of the present invention is described with reference to FIG. 6. In FIG. 6, the same reference numerals as those in FIGS. 1 and 2 designate the same or the similar portion. The difference between FIGS. 1 and 2 is the member for holding the electromagnetic coil portion 3 and the shape of the peripheral portion thereof. An outer housing 26 of ECU 1 has two chambers, namely a first chamber for accommodating an inner housing 22 and a second chamber for equipping an electronical circuit portion 8, wherein these chambers are divided by a divider 26α. Numeral 22 designates the inner housing in which the electromagnetic coil portions 3b and 3f and a bus bar 13 are equipped at predetermined positions. The inner housing 22 in which the bus bar 13 is provided is inserted from a hole in the divider 26α and fixed to the outer housing 26.

Concerning the electromagnetic portion, a part of the inner housing 22 is interposed between the upper yoke 17 and the lower yoke 18, and the bobbin 16 is in contact with the inner housing 22. Similarly to Example 1, the upper yoke 17 and the lower yoke 18 can play in the inner housing 22, and the bobbin 16 is inwardly in contact with both the yokes interposing a gap.

By providing the inner housing 22, an inner housing subassembly having the electromagnetic coil portion 3 and the bus bar 13 can be handled simultaneously, wherein a capability of assembling can be improved. Similarly to Example 1, procedure of assembling is: at first, attaching the electromagnetic coil portion 3 to the inner housing 22; and thereafter the inner housing 22 is equipped in the outer housing 26, for example, by adhering.

EXAMPLE 4

Example 4 of the present invention is described with reference to FIGS. 1, 2, 3 and 5, wherein water proofness is specifically described. The water proofness in a chamber accommodating an electromagnetic coil portion 3 is attained by jointing a packing 25 with a second unit, for example, by inserting the packing 25 in a groove provided in the periphery of coil housing 26 in a similar manner to Examples 1 and 3. The water proofness in the chamber accommodating the electromagnetic coil portion is not severe as the water proofness in an electronic circuit room 29. Further, when the temperature of device is increasing by heat, there is a possibility that the device is watered at the time of running. In this case, because a water drop may be sucked by a respiration operation, it is necessary to provide a water drain hole depending on a direction of equipping in the vehicle, a filter for avoiding a pressure difference between the inside and the outside of ECU or the like. For Example, it is possible to provide the water drain hole (not shown) in the chamber for accommodating the electromagnetic coil portion and the filter (not shown) in the electronic circuit room 29.

In Example 1, in order to assure the water proofness in the electronic circuit room 29, it is possible to pour a water proof adhesive in a protrusion and a recess provide in the periphery 24β between the intermediate member 7 and the coil housing 6. Or the water proofness is assured by welding the periphery 24β of these using vibration. Further, the periphery 24α between the intermediate member 7 and the cover 9 can be proofed against water by a similar method thereto. Further, the periphery 24γ between the first contact portion 11 and the contact portion 20 of the connecter portion is similarly treated as shown in FIG. 3. In accordance with the width and the depth of water proof groove and the water proof method, a level of proofing against water can be changed. Thus, the water proofness in the electronic circuit room 29 can be assured. In this, both of the water proofness and the equipment are obtainable by a method of adhering.

In Example 3, the water proofness in the electronic circuit room 29 is obtainable by a similar method to those described in the above, namely using the periphery 23α of the inner housing 22, the periphery 23β of the contact portion 11 and the contact face of the divider 26α of the outer housing 26. Also, the outer housing 26 and the cover 9 are similarly proofed against water at the periphery 24α.

Thus, by providing grooves around the components and adopting the shape and the structure of not having many apertures, it is possible to assure the water proofness easily.

EXAMPLE 5

Figure 7:
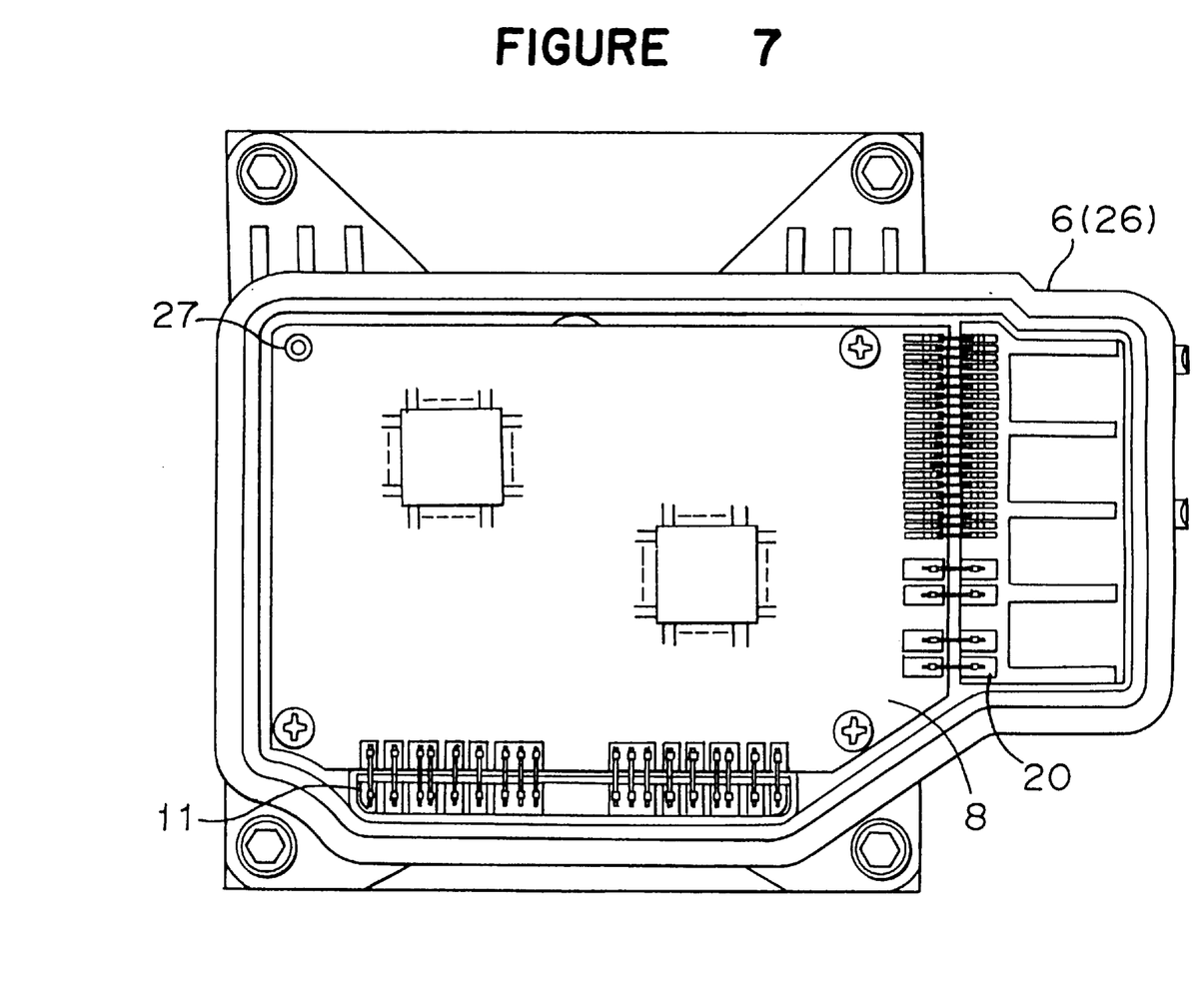
FIG. 7 is plan view of pressure controlling device for vehicle by omitting several parts in accordance with Examples 1 through 5 of the present invention.

Example 5 of the present invention is described specifically for an electronic circuit portion with reference to FIG. 7. The same references as those in FIGS. 1 and 2 designate the same or the similar portions. The electronic circuit portion 8 is accommodated in an area substantially the same as a face for engaging the first unit and the second unit, wherein the electronic circuit portion 8 is connected to the first contact 11 and a contact portion 20 of connector 10. Especially, an electronic circuit substrate does not extend in the vicinity of the connector 10. The connector is apt to deform because it is thin and has a low rigidity when the connector is connected and disconnected, a sink occurs in the coil housing 6 (or 26) and/or thermal stress is applied. Therefore, when the electronic circuit substrate is extended to the connector, the substrate is subject to a stress; electric contact becomes defective; and there is a possibility of producing a malfunction of the electronic circuit operation. Accordingly, when an edge of the substrate is fixed at a position apart from the connector, the above-mentioned problem is not caused. In this Example, pins of the connector are extended in the vicinity of the substrate and connected electrically by a wire bonding. However, a flexible jumper wire can also be used to connect the connector pins and the electronic circuit portion.

In the first contact 11, the total number of connecting portions is twelve, wherein the number of common line of power source is 2, the number of the connecting portions to respective coils is 8 with respect to eight electromagnetic coils; and the number of lines for driving a pump motor in order for increasing break pressure is 2. On the other hand, the contact portion 20 of connector has the same number of connecting portions as the number of connector pins to be used. At the connecting portions requiring sufficient electric current capacity, for example, a power source, a ground line and a pump motor line, it is necessary to assure the electric current capacity by increasing a diameter of bonding wire and/or by bonding a plural number of wires. Further, when the electronic circuit portion 8 is fixed to an intermediate member 7 or an outer housing 26, the periphery of the first contact portion 11 and the periphery of the portion 20 contacting with the connector are fixed. However, it is not fixed at portions apart from the peripheries. In this Example, screws are used to fix three portions and a protrusion of housing is inserted in a hole provided in the substrate mainly for positioning at one end 27. By this, the screwed portions can be recognized as a starting point when considering the thermal stress. The linear coefficient of expansion of the housing material of PBT is about $30\times10^{-6}$ mm/° C. If the substrate is made of glass epoxy material, the linear coefficient of expansion is about $14\times10^{-6}$ mm/° C. Provided that the length of substrate is 100 mm, a displacement between these caused by a heat becomes about 0.2 mm. In a case that the four corners of substrate are fixed, the displacement is directly applied to the substrate as a stress. Therefore, the displacement can be released when at least one corner of the substrate is not fixed to the housing and engaged flexibly.

Figures 8A, 8B:
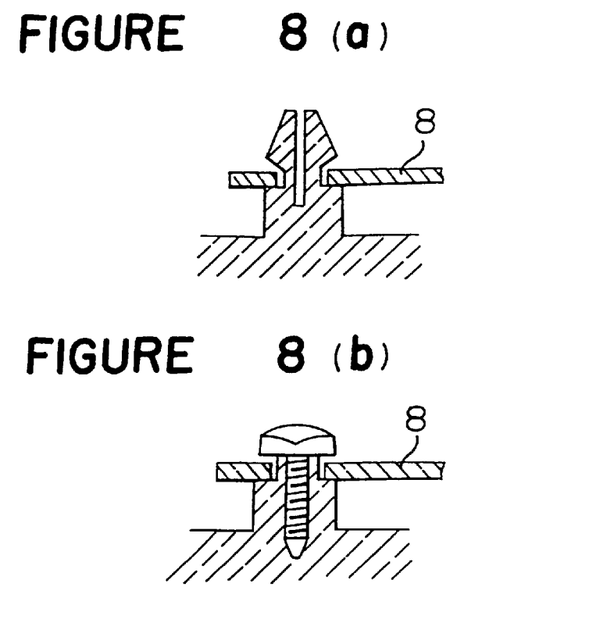
FIG. 8a is an enlarged view in section for showing a portion of attaching an electronic circuit according to Example 5 of the present invention.
FIG. 8b is an enlarged view in section for showing of a portion of attaching an electronic circuit according to Example 5 of the present invention.

Although, in this Example, the three corners in the periphery of the contact portion are fixed by screws, the substrate can be engaged flexibly with the housing at two corners or three corners as shown in FIG. 8. For example, FIG. 8a shows a protrusion for engaging which protrudes from the housing, wherein the substrate is interposed between a seat and an overhang, and there is a gap between a hole in the substrate and a neck portion of the protrusion. On the other hand, in FIG. 8b, a seat having a ⌂-like shape is inserted in a hole in the substrate and screwed, wherein the ⌂-like portion has a gap from the hole in the substrate and a neck portion has a height larger than the thickness of substrate. Accordingly, when the screw is tightened, the substrate is not forced to be pressed. In such a structure, when the substrate and the housing are connected, it is possible to absorb the displacement caused by the above-described thermal stress. In a case that the structure of flexibly engaging is adopted as in FIG. 8, it is necessary to prudently select a shape of loop of connecting by wire-bonding so that a displacement caused by thermal stress and so on are absorbed by this loop shape. Also, it is possible to equip an electronic circuit portion by an elastic adhesive.

The first advantage of a pressure controlling device for vehicle according to the present invention is that a stress in an electrically connected portion of electromagnetic coil portion can be relaxed while enabling engagement and separation between ECU and H/U because the electromagnetic coil portion comprises a bobbin around which a coil is wound, an upper yoke and a lower yoke which are provided around the bobbin and forms a magnetic path, and elastic object provided between the lower yoke and the bobbin and a means for contacting the bobbin to a part of the housing in order to restrict movement of the bobbin.

The second advantage of a pressure controlling device for vehicle according to the present invention is that a stress in an electrically connected portion of electromagnetic coil portion can be relaxed while enabling engagement and separation between ECU and H/U because a first unit is composed of a coil housing for accommodating the plurality of electromagnetic coil portions, an intermediate member having an electronic circuit portion which is provided in the coil housing and a cover for covering the intermediate member, wherein the coil housing is provided with a conductive connecting member having a first contact portion for connecting to the electronic circuit portion and a second contact portion for connecting to the plurality of electromagnetic coil portions; and the bobbins of the plurality of electromagnetic coil portions are constituted so as to be in contact with a part of the coil housing.

The third advantage of a pressure controlling device for vehicle according to the present invention is that a stress in an electrically connected portion of electromagnetic coil portion can be relaxed while enabling engagement and separation between ECU and H/U because a first unit is composed of an outer housing having a first chamber including an inner housing and a second chamber in which the electronic circuit portion is provided and a cover for covering the second chamber, wherein a conductive connecting member composed of a first contact portion to which the electronic circuit portion is connected and a second contact portion to which the plurality of electromagnetic coil portions are connected; and bobbins of the plurality of electromagnetic coil portions are constituted so as to be in contact with a part of the inner housing.

The fourth advantage of a pressure controlling device for vehicle according to the present invention is that a stress in an electrically connected portion of electromagnetic coil portion can be relaxed while enabling engagement and separation between ECU and H/U because the electromagnetic coil portion is composed of an upper yoke and a lower yoke interposing a bobbin around which a coil is wound with a gap; a part of the housing is interposed between the yoke and the bobbin; an elastic object is interposed between the lower yoke and the bobbin; both the yokes are engaged so that the bobbin is in contact with a part of the housing for enabling both the yokes can play in the gap with respect to the housing at the time of inserting a valve body.

The fifth advantage of a pressure controlling device for vehicle according to the present invention is that a water proofness of ECU room is easily obtainable because a first contact portion of conductive connecting member is assembled at one position and formed to appear on a side of providing an electronic circuit portion of a member for providing the electronic circuit portion.

The sixth advantage of a pressure controlling device for vehicle according to the present invention is that a mechanical stress and a thermal stress applied to an electronic circuit portion can be relaxed because the electronic circuit portion is connected to a connector portion for connecting to the outside by arranging the electronic circuit portion interposing a gap from the connector portion and electrically connecting these; and the electronic circuit portion is fixed to the housing so that a portion apart from a portion connecting with the connector portion and a portion connecting with the first contact portion is engaged flexibly with the housing.

Obviously, numerous modifications and variations of the present invention are possible in light of the above teachings. It is therefore to be understood that within the scope of the appended claims, the invention may be practiced otherwise than as specifically described herein.

What is claimed is:

1. A pressure controlling device for a vehicle comprising: a first unit having an electronic circuit portion provided in a housing, a plurality of electromagnetic coil portions and a conductive connecting member for electrically connecting these, a second unit having a plurality of valve bodies and a network of pressure paths, wherein the plurality of valve bodies in the second unit are protruded to be inserted in the first unit respectively, wherein the electromagnetic coil portion are composed of a bobbin around which a coil is wound, an upper yoke and a lower yoke each provided around the bobbin and forming a magnetic path, an elastic object provided between the lower yoke and the bobbin and a means for contacting the bobbin to a part of the housing for restricting movement of the bobbin;

wherein a first unit includes a coil housing for accommodating a plurality of magnetic coil portions, an intermediate member having an electronic circuit portion and provided in the coil housing and a cover for covering the intermediate member; and a conductive connecting member including a first contact portion for connection to the electronic circuit portion and a second contact portion for connecting to the plurality of electromagnetic coil portions is provided in the coil housing; and bobbins in the plurality of electromagnetic coil portions are constructed so as to be in contact with a part of the coil housing;

wherein electromagnetic coil portions includes an upper yoke and a lower yoke both provided in a bobbin around which a coil is wound interposing a gap; a part of housing is interposed between the upper yoke and the bobbin; an elastic object is interposed between the lower yoke and the bobbin; and the bobbin is engaged by both of the yokes so as to be in contact with a part of the housing so that both of the yokes can play in the gap with respect to the housing when a valve body is inserted; and wherein the electronic circuit portion is electrically connected to connector portion, connectable with the outside, by arranging the electronic circuit portion and the connector portion and interposing a gap between the electronic circuit portion and the connector portion; and the electronic circuit portion is fixed to a housing such that at least a part of the electronic circuit portion apart from a position connected with the connector portion or a position connected with the first contact portion is flexibly engaged with the housing.

2. A pressure controlling device for a vehicle comprising: a first unit having an electronic circuit portion provided in a housing, a plurality of electromagnetic coil portions and a conductive connecting member for electrically connecting these, a second unit having a plurality of valve bodies and a network of pressure paths, wherein the plurality of valve bodies in the second unit are protruded to be inserted in the first unit respectively, wherein the electromagnetic coil portion are composed of a bobbin around which a coil is wound, an upper yoke and a lower yoke each provided around the bobbin and forming a magnetic path, an elastic object provided between the lower yoke and the bobbin and a means for contacting the bobbin to a part of the housing for restricting movement of the bobbin;

wherein a first unit includes a coil housing for accommodating a plurality of magnetic coil portions, an intermediate member having an electronic circuit portion and provided in the coil housing and a cover for covering the intermediate member; and a conductive connecting member including a first contact portion for connection to the electronic circuit portion and a second contact portion for connecting to the plurality of electromagnetic coil portions is provided in the coil housing; and bobbins in the plurality of electromagnetic coil portions are constructed so as to be in contact with a part of the coil housing; and wherein said conductive connecting member is connected at one end at a single location and on a single side of said electronic circuit portion.

3. A pressure controlling device for a vehicle comprising: a first unit having an electronic circuit portion provided in a housing, a plurality of electromagnetic coil portions and a conductive connecting member for electrically connecting these, a second unit having a plurality of valve bodies and a network of pressure paths, wherein the plurality of valve bodies in the second unit are protruded to be inserted in the first unit respectively, wherein the electromagnetic coil portion are composed of a bobbin around which a coil is wound, an upper yoke and a lower yoke each provided around the bobbin and forming a magnetic path, an elastic object provided between the lower yoke and the bobbin and a means for contacting the bobbin to a part of the housing for restricting movement of the bobbin;

wherein a first unit includes an outer housing having a first chamber having an inner housings and a second chamber provided with an electronic circuit portion, and a cover for covering the second chamber; a conductive connecting member including a first contact portion for connecting to the electronic circuit portion and a second contact portion for connecting to the plurality of electromagnetic coil portions are provided in the inner housing; and bobbins in the plurality of electromagnetic coil portions are constructed so as to be in contact with a part of the inner housing;

wherein said electromagnetic coil portions includes an upper yoke and a lower yoke both provided in a bobbin around which a coil is wound interposing a gap; a part of housing is interposed between the upper yoke and the bobbin; an elastic object is interposed between the lower yoke and the bobbin; and the bobbin is engaged by both of the yokes so as to be in contact with a part of the housing so that both of the yokes can play in the gap with respect to the housing when a valve body is inserted; and wherein the electronic circuit portion is electrically connected to a connector portion, connectable with the outside, by arranging the electronic circuit portion and the connector portion and interposing a gap between the electronic circuit portion and the connector portion; and the electronic circuit portion is fixed to a housing such that at least a part of the electronic circuit portion is engaged flexibly with the housing.

4. A pressure controlling device for a vehicle comprising: a first unit having an electronic circuit portion provided in a housing, a plurality of electromagnetic coil portions and a conductive connecting member for electrically connecting these, a second unit having a plurality of valve bodies and a network of pressure paths, wherein the plurality of valve bodies in the second unit are protruded to be inserted in the first unit respectively, wherein the electromagnetic coil portion are composed of a bobbin around which a coil is wound, an upper yoke and a lower yoke each provided around the bobbin and forming a magnetic path, an elastic object provided between the lower yoke and the bobbin and a means for contacting the bobbin to a part of the housing for restricting movement of the bobbin;

wherein a first unit includes an outer housing having a first chamber having an inner housings and a second chamber provided with an electronic circuit portion, and a cover for covering the second chamber; a conductive connecting member including a first contact portion for connecting to the electronic circuit portion and a second contact portion for connecting to the plurality of electromagnetic coil portions are provided in the inner housing; and bobbins in the plurality of electromagnetic coil portions are constructed so as to be in contact with a part of the inner housing; and wherein the electronic circuit portion is electrically connected to a connector portion, connectable with the outside, by arranging the electronic circuit portion and the connector portion and interposing a gap between the electronic circuit portion and the connector portion; and the electronic circuit portion is fixed to a housing such that at least a part of the electronic circuit portion is engaged flexibly with the housing.

5. A pressure controlling device for a vehicle comprising: a first unit having an electronic circuit portion provided in a housing, a plurality of electromagnetic coil portions and a conductive connecting member for electrically connecting these, a second unit having a plurality of valve bodies and a network of pressure paths, wherein the plurality of valve bodies in the second unit are protruded to be inserted in the first unit respectively, wherein the electromagnetic coil portion are composed of a bobbin around which a coil is wound, an upper yoke and a lower yoke each provided around the bobbin and forming a magnetic path, an elastic object provided between the lower yoke and the bobbin and a means for contacting the bobbin to a part of the housing for restricting movement of the bobbin; and wherein electromagnetic coil portions includes an upper yoke and a lower yoke both provided in a bobbin around which a coil is wound interposing a gap; a part of housing is interposed between the upper yoke and the lower yoke and the bobbin; and the bobbin is engaged by both of the yokes so as to be in contact with a part of the housing so that both of the yokes can play in the gap with respect to the housing when a valve body is inserted; and wherein said conductive connecting member is connected at one end at a single location and on a single side of said electronic circuit portion.

6. A pressure controlling device for a vehicle comprising: a first unit having an electronic circuit portion provided in a housing, a plurality of electromagnetic coil portions and a conductive connecting member for electrically connecting these, a second unit having a plurality of valve bodies and a network of pressure paths, wherein the plurality of valve bodies in the second unit are protruded to be inserted in the first unit respectively, wherein the electromagnetic coil portion are composed of a bobbin around which a coil is wound, an upper yoke and a lower yoke each provided around the bobbin and forming a magnetic path, an elastic object provided between the lower yoke and the bobbin and a means for contacting the bobbin to a part of the housing for restricting movement of the bobbin; and wherein electromagnetic coil portions includes an upper yoke and a lower yoke both provided in a bobbin around which a coil is wound interposing a gap; a part of housing is interposed between the upper yoke and the lower yoke and the bobbin; and the bobbin is engaged by both of the yokes so as to be in contact with a part of the housing so that both of the yokes can play in the gap with respect to the housing when a valve body is inserted; and wherein the electronic circuit portion is electrically connected to a connector portion, connectable with the outside, by arranging the electronic circuit portion and the connector portion and interposing a gap between the electronic circuit portion and the connector portion; and the electronic circuit portion is fixed to a housing such that at least a part of the electronic circuit portion is engaged flexibly with the housing.

7. A pressure controlling device for a vehicle comprising: a first unit having an electronic circuit portion provided in a housing, a plurality of electromagnetic coil portions and a conductive connecting member for electrically connecting these, a second unit having a plurality of valve bodies and a network of pressure paths, wherein the plurality of valve bodies in the second unit are protruded to be inserted in the first unit respectively, wherein the electromagnetic coil portion are composed of a bobbin around which a coil is wound, an upper yoke and a lower yoke each provided around the bobbin and forming a magnetic path, an elastic object provided between the lower yoke and the bobbin and a means for contacting the bobbin to a part of the housing for restricting movement of the bobbin; and wherein said conductive connecting member is connected at one end at a single location and on a single side of said electronic circuit; and wherein the electronic circuit portion is electrically connected to a connector portion, connectable with the outside, by arranging the electronic circuit portion and the connector portion and interposing a gap between the electronic circuit portion and the connector portion; and the electronic circuit portion is fixed to a housing such that at least a part of the electronic circuit portion is engaged flexibly with the housing.

8. A pressure controlling device for a vehicle comprising: a first unit having an electronic circuit portion provided in a housing, a plurality of electromagnetic coil portions and a conductive connecting member for electrically connecting these, a second unit having a plurality of valve bodies and a network of pressure paths, wherein the plurality of valve bodies in the second unit are protruded to be inserted in the first unit respectively, wherein the electromagnetic coil portion are composed of a bobbin around which a coil is wound, an upper yoke and a lower yoke each provided around the bobbin and forming a magnetic path, an elastic object provided between the lower yoke and the bobbin and a means for contacting the bobbin to a part of the housing for restricting movement of the bobbin; and wherein the electronic circuit portion is electrically connected to a connector portion, connectable with the outside, by arranging the electronic circuit portion and the connector portion and interposing a gap between the electronic circuit portion and the connector portion; and the electronic circuit portion is fixed to a housing such that at least a part of the electronic circuit portion is engaged flexibly with the housing.

9. A pressure controlling device for a vehicle comprising: a first unit having an electronic circuit portion provided in a housing, a plurality of electromagnetic coil portions and a conductive connecting member for electrically connecting these, a second unit having a plurality of valve bodies and a network of pressure paths, wherein the plurality of valve bodies in the second unit are protruded to be inserted in the first unit respectively, wherein the electromagnetic coil portion are composed of a bobbin around which a coil is wound, an upper yoke and a lower yoke each provided around the bobbin and forming a magnetic path, an elastic object provided between the lower yoke and the bobbin and a means for contacting the bobbin to a part of the housing for restricting movement of the bobbin;

wherein a first unit includes a coil housing for accommodating a plurality of magnetic coil portions, an intermediate member having an electronic circuit portion and provided in the coil housing and a cover for covering the intermediate member; and a conductive connecting member including a first contact portion for connection to the electronic circuit portion and a second contact portion for connecting to the plurality of electromagnetic coil portions is provided in the coil housing; and bobbins in the plurality of electromagnetic coil portions are constructed so as to be in contact with a part of the coil housing;

wherein electromagnetic coil portions includes an upper yoke and a lower yoke both provided in a bobbin around which a coil is wound interposing a gap; a part of housing is interposed between the upper yoke and the bobbin; an elastic object is interposed between the lower yoke and the bobbin; and the bobbin is engaged by both of the yokes so as to be in contact with a part of the housing so that both of the yokes can play in the gap with respect to the housing when a valve body is inserted;

wherein the electronic circuit portion is electrically connected to a connector portion, connectable with the outside, by arranging the electronic circuit portion and the connector portion and interposing a gap between the electronic circuit portion and the connector portion; and the electronic circuit portion is fixed to a housing such that at least a part of the electronic circuit portion is engaged flexibly with the housing; and wherein the electronic circuit portion is electrically connected to a connector portion connectable with the outside, by arranging the electronic circuit portion and the connector portion and interposing a gap between the electronic circuit portion and the connector portion; and the electronic circuit portion is fixed to a housing such that at least a part of the electronic circuit portion apart from a position connected with the connector portion or a position connected with the first contact portion is flexibly engaged with the housing.

10. A pressure controlling device for vehicle comprising: a first unit having an electronic circuit portion provided in a housing, a plurality of electromagnetic coil portions and a conductive connecting member for electrically connecting these, a second unit having a plurality of valve bodies and a network of pressure paths, wherein the plurality of valve bodies in the second unit are protruded to be inserted in the first unit respectively, wherein the electromagnetic coil portion are composed of a bobbin around which a coil is wound, an upper yoke and a lower yoke each provided around the bobbin and forming a magnetic path, an elastic object provided between the lower yoke and the bobbin and a means for contacting the bobbin to a part of the housing for restricting movement of the bobbin;

wherein a first unit includes a coil housing for accommodating a plurality of magnetic coil portions, an intermediate member having an electronic circuit portion and provided in the coil housing and a cover for covering the intermediate member; and a conductive connecting member including a first contact portion for connection to the electronic circuit portion and a second contact portion for connecting to the plurality of electromagnetic coil portions is provided in the coil housing; and bobbins in the plurality of electromagnetic coil portions are constructed so as to be in contact with a part of the coil housing; and wherein the electronic circuit portion is electrically connected to a connector portion connectable with the outside, by arranging the electronic circuit portion and the connector portion and interposing a gap between the electronic circuit portion and the connector portion; and the electronic circuit portion is fixed to a housing such that at least a part of the electronic circuit apart from a position connected with the connector portion or a position connected with the first contact portion is flexibly engaged with the housing.

* * * * *